United States Patent Office 3,393,136
Patented July 16, 1968

3,393,136
PREPARATION OF OXALATES
Donald M. Fenton, Anaheim, and Paul J. Steinwand, Fullerton, Calif., assignors to Union Oil Company of California, Los Angeles, Calif., a corporation of California
No Drawing. Filed Sept. 28, 1965, Ser. No. 491,039
7 Claims. (Cl. 204—59)

This invention relates to a method for the preparation of oxalates and in particular to the synthesis of oxalates from carbon monoxide and aliphatic alcohols.

Oxalates are prepared in accordance with this invention by contacting carbon monoxide with an alcoholic solution of a platinum group metal salt and a soluble ferric or cupric salt while maintaining the salts in an oxidized state. The contacting is performed in a substantially anhydrous medium at mild temperatures and superatmospheric pressures, preferably in excess of about 300 pounds per square inch. The salts are maintained in an oxidized state by simultaneously contacting the solution with oxygen as hereafter specified or by application of electrolytic processing hereafter described.

The subject of platinum group emtal catalyzed carbonylation reactions has receievd recent attention and reference is made to Patent 3,114,762 which describes the reaction of carbon monoxide with an alcoholic solution of palladium or platinum chloride for the preparation of alkyl carbonates. This reaction results in reduction of the palladous or platinum ion to the metal in a stoichiometric quantity corresponding to the amount of carbonate produced. The patent discloses that the reaction can be continued somewhat by the addition of a large amount of a suitable oxidizing agent such as cupric chloride to the solution. While this reaction produces carbonates, substantially little or no oxalates are produced in the method as set forth in this patent.

We have now found that the carbonylation reaction can be modified to produce a high yield of oxalates, exceeding the yield of carbonates, by use of a ferric or cupric redox agent in the solution and by the simultaneous introduction of oxygen or application of a direct current electrical potential to the reaction zone to maintain the redox agents in an oxidized state. The reaction zone is also maintained under superatmospheric pressures of carbon monoxide. Under these conditions we have discovered that a continuous conversion to an amount of products in excess of that stoichiometrically equivalent to the oxidizing power of the salts can be achieved. Preferably, a suitable dehydrating agent is employed in the reaction solvent to prevent the accumulation of water formed by the oxidation reaction. In this manner the ferric or cupric salts and the platinum group metal salt is retained in an oxidized state, functioning catalytically.

The platinum group metal useful in our process can be any of the platinum subgroup, i.e., platinum, rhodium or ruthenium, or any of the palladium subgroup, i.e., palladium, uranium or osmium. Palladium is preferred because of its greater activity. In general, the platinum group metal can be employed in amounts between about 0.001 and 2 weight percent of the reaction medium; preferably between about 0.04 and about 0.5 weight percent. The platinum group metal can be introduced into the reaction medium as a finely divided metal, as a soluble salt or as a chelate. Examples of suitable salts are the halides, sulfates, nitrates and salts of the lower $C_1$-$C_5$ carboxylates such as palladium chloride, rhodium acetate, ruthenium bromide, osmium salts, irridium nitrate, palladium sulfate, platinum acetate, etc. Examples of suitable chelates are palladium acetylacetonate and complexes of the aforementioned platinum group metals with such conventional chelating agents as citric acid, ethylene diamine tetraacetic acid, etc.

The other component of the catalyst is a soluble ferric or cupric salt. Typical salts are the ferric or cupric carboxylates having 1 to about 5 carbons, e.g., cupric acetate, ferrous propionate, ferric acetate, cupric butyrate, etc., as well as the halide salts, e.g., cupric chloride, ferric chloride, ferric bromide, cupric bromide, ferric iodide, ferric sulfate, ferric nitrate, cupric nitrate, etc. The amount of ferric or cupric salt is generally from about 0.05 to about 5 weight percent of the reaction medium. Preferably, the salt is employed in an amount from 0.1 to about 2 weight percent since it functions catalytically as a redox agent, permitting the use of oxygen as the oxidant.

As previously mentioned, the reaction is performed in an anhydrous alcoholic media. The alcohol can be a monohydric saturated aliphatic alcohol such as methanol, ethanol, propanol, isopropanol, butanol, pentanol, hexanol, octanol, decenol, etc., as well as alicyclic saturated alcohols such as cyclohexanol, cycloheptanol, etc.

The reaction is preferably performed in the presence of a suitable dehydrating agent which maintains the oxidation zone anhydrous and prevents the accumulation of water. Examples of suitable dehydrating agents include the various alkyl orthoformic esters, particularly those of alkyl groups having 1 to about 6 carbons, e.g., ethyl orthoformate, methyl orthoformate, propyl orthoformate, isopropyl orthoformate, butyl orthoformate, amyl orthoformate, etc.

As previously mentioned, the reaction is performed under liquid phase conditions in an anhydrous alcoholic reaction medium. Various organic liquids can be employed as suitable inert solvents or the reaction can be run entirely in an anhydrous alcohol. If desired, however, a portion, from 0 to about 90 percent of the reaction medium, can include a suitable inert organic solvent. Suitable organic solvents include: alkyl sulfoxides and sulfones such as dimethyl sulfoxide, propyl ethyl sulfoxide, diisopropyl sulfone, decyl methyl sulfoxide, butyl amyl sulfone, diisooctyl sulfoxide, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, methyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

As previously mentioned, the reaction in its preferred embodiment is performed under superatmospheric pressures of carbon monoxide and oxygen. In the absence of oxygen or an electrolytical potential the salts are quickly reduced to their reduced state, i.e., the metal of the platinum group metal and cuprous or ferrous ions. This results in the liberation of excess halide, particularly when the redox salt is in the cuprous or ferrous state. The presence of this excess anion inhibits the oxalate formation and favors carbonate production contrary to the purposes of this invention. It is therefore preferred to employ an oxidizing environment which maintains the redox salts in their highest valency state and thus preclude excess carbonate formation.

It is also preferred to maintain a low concentration of halide anions in the solution for both oxygen and electrolytic processing. This concentration should be less than about 3 to 5 times the concentration of the redox cation concentration. Most preferably, the halide anion concentration is no greater than the sum of three times the"

iron cation concentration and twice the copper cation concentration.

The redox metal salts can be maintained in their highest valency state, i.e., oxidized state, according to one embodiment of the invention, by maintaining at least about 1 and preferably greater than about 2 percent oxygen in the gas phase in contact with the liquid reactants. This can be suitably accomplished by continuous methods for the analysis of the oxygen content of this gas stream and adjustment of the rate of introduction of oxygen into contact with the liquid reactants in response thereto. It is desirable to avoid the formation of explosive mixtures of oxygen and a combustible organic vapor in the gas phase and accordingly we prefer to maintain the oxygen content of the gas phase less than about 10 and preferably less than about 7 percent.

The reaction can suitably be performed by simultaneously introducing carbon monoxide and oxygen into contact with the alcoholic reaction medium containing the aforementioned reactants and catalysts. In general, superatmospheric pressure of about 5 to abaut 700 atmospheres, preferably from about 20 to about 100 atmospheres are employed with the partial pressure of carbon monoxide being from about 50 to about 90 percent of the total reaction pressure. The remainder of the reaction pressure can be achieved by oxygen introduction or, if desired, a suitable inert gas such as nitrogen, carbon dioxide, etc., can be added as a diluent for the reactants. The reaction temperature in either processing technique should be from about 30° to 300° C.; preferably from about 75° to 200° C. and suitable heat transfer means can be positioned in the reaction zone to remove the exothermic heat of reaction and thereby maintain the desired temperature.

In a second embodiment of the invention, the redox metal salts can be maintained in an oxidized state by an electrolytic method. In this method, the anode chamber of an electrolytic cell having anode and cathode chambers separated by a porous diaphram is used as the reaction zone.

Various mechanical designs of electrolytic cells can be used in the oxidation. In general, such cells comprise two chambers which are separated by a porous diaphram to prevent a mixture of the electrolytes. These chambers are preferably equipped with mechanical stirrers and heating or cooling elements to maintain the desired reaction temperature. The anode chamber can be composed of or lined with stainless steel or any other similar corrosion resistant material. The anode can be carbon or any inert metal, i.e., any metal having an oxidation potential more negative than the oxidizing potential of the cupric ion in the anolyte. Generally, carbon electrodes are preferred.

The cathode chamber can be constructed of or lined with stainless steel or other similar corrosion resistant metals; however, mild or carbon steel can also be used when the walls of the cathode chamber are employed as the cathode by applying the negative potential of the cell thereto. In this method, current densities greater than about 0.4 amperes per square centimeter can be used in this chamber and at this current density, substantially no corrosion of the mild steel will occur.

The cell chambers are separated by a membrane which prevents mixing of the anolyte and catholyte, yet which is sufficiently porous to permit passage of current conducting anions, particularly halide anions as hereafter described In general, various ceramic materials such as fritted glass or sintered glass powders can be used. Other suitable membranes can be porous or foamed plastics such as Teflon, asbestos, etc.

The mechanical design of the cell can be widely varied. The cell can comprise separate vessels in juxtaposition communicating with each other by a salt bridge or common arm which contains the porous membrane. If desired, the chambers can be provided within a single vessel by dividing the vessel with a wall, a portion or all of which comprises the aforementioned porous membrane. In a preferred design, the chambers are concentrically positioned cylinders having a steel outer vessel to be used as the cathode and an inner concentric cylinder composed of the porous membrane. Within the latter is disposed a carbon rod which, preferably, is fluted to expose a maximum surface area which is used as the anode. An inlet for carbon monoxide and anolyte and an outlet for removal of the anolyte and product are provided interiorly of the porous membrane, i.e., in the anode chamber, and a gas outlet is provided in the annular chamber between the porous membrane and the outer vessel, i.e., in the cathode chamber.

The electrolytic processing can conveniently be performed in the aforementioned or any conventional electrolytic cell by using an anolyte that comprises, preferably, an anhydrous reaction medium containing any of the aforemetioned alcohols alone or in admixture with any of the aforementioned solvents. The anhydrous state can be assured by use of from 1 to 50, preferably 1 to 15 percent of any of the aforementioned dehydrating agents. The anolyte also contains a soluble salt of the aforementioned platnium metals, and preferably, a soluble salt of one of the aforementioned multivalent metals, these salts being used in the previously set forth concentrations.

During the reaction, an alcohol and carbon monoxide are charged, preferably continuously, to the anode chamber. There occurs during the reaction a net formation of hydrogen cations as well as desired ester product in the anode chamber, released from the alcoholic reactant in the ester formation. In a preferred process, the anolyte also contains the aforementioned quantities of a halide anion. When the product is recovered, e.g., either by vaporization or stripping from the anode chamber or by withdrawal of a portion of the liquid anolyte and subsequent distillation, the volatile hydrogen halide is also removed from the liquid anolyte. In this fashion, the pH of the anolyte can be readily maintained constant at the desired initial value despite the net formation of hydrogen cations in the reaction. Hydrogen will be produced by the reduction in the cathode and the halide anions will pass through the diaphragm cell divider as the current conducting species, thereby maintaining a constant halide concentration in the anolyte. The hydrogen halide volatilized during product recovery can of course be introduced into the cathode chamber.

The invention will now be illustrated by the following examples setting forth the results obtainable thereby:

Example 1

A titanium lined autoclave was employed in the following experiment. Into the autoclave was introduced 200 milliliters ethanol, 200 milliliters ethyl orthoformate, 1 gram palladium chloride and 10 gram ferric chloride. The autoclave was pressured to 1000 p.s.i.g. with carbon monoxide. The autoclave was heated to 85° C. and a total of 100 p.s.i. of xoygen was introduced at 25 p.s.i. increments. The autoclave was then cooled, opened and the liquid products removed and distilled to recover 5 grams of ethyl oxalate, 9 grams of ethyl acetate, 3 grams of ethyl chloride and 20 grams of ethyl ether.

Example 2

The experiment was repeated at 125° C. A total of 91 p.s.i. of oxygen was introduced in 20 to 25 p.s.i. increments over a 25 minute reaction period. The reaction was then discontinued, the autoclave cooled, opened and the products distilled to recover 11 grams of ethyl oxalate, 4 grams of ethyl carbonate, 21 grams of ethyl acetate, 3 grams of ethyl chloride and 10 grams of ethyl ether.

Example 3

The reaction was repeated using a reaction medium consisting of 200 milliliters ethanol, 200 milliliters ethyl orthoformate, 5 grams cupric chloride and 1 gram palladium chloride. The reactants were pressured to 1000 p.s.i.g. with carbon monoxide at 125° C. and oxygen was introduced at 20–25 p.s.i. increments until a total of 100 p.s.i. oxygen had been introduced. Thereafter the reactants were cooled, removed from the autoclave and distilled to obtain 42 grams of ethyl oxalate, 25 grams of ethyl carbonate, 2 grams of ethyl chloride and 2 grams of ethyl acetate.

Example 4

The reaction was repeated using a reaction solvent consisting of 200 milliliters ethanol and 200 milliliters ethyl orthofromate. To the solvent was added 1 gram palladium chloride, 10 grams ferric chloride and 5 grams ferrous chloride and the autoclave was closed and pressured to 1000 p.s.i.g. with carbon monoxide and heated to 125° C. Thereafter oxygen was slowly introduced in 20 p.s.i. increments until a total of 100 p.s.i. oxygen had been added. The autoclave was then cooled, depressured, opened and the liquid contents distilled to recover 9 grams of ethyl oxalate and about 1 gram of ethyl carbonate. The preceding examples are intended solely to illustrate a mode of practicing the invention and to demonstrate the results obtainable thereby. It is not intended that this disclosure will be unduly limiting of the invention but rather that the obvious substitution of the previously mentioned reactants and equivalents of those actually employed can be readily made by those skilled in the art. Thus, although the example has been described with particular reference to the use of ethanol as a reaction solvent, it is apparent that this ethanol can be replaced with equal weight quantities of any of the aforementioned aliphatic and alicyclic alcohols. It is likewise apparent that equal molar quantities of the ethyl orthoformate dehydrating agent can be replaced with any of the aforementioned dehydrating agents.

We claim:

1. The method for manufacturing oxalate esters of saturated alcohols that comprises:
   introducing into a reaction zone a substantially anhydrous alcoholic reaction medium comprising a saturated monohydric alcohol having from 1 to about 12 carbons, from about 0.001 to about 2 weight percent of a platinum group metal, from about 0.05 to about 5 weight percent of a redox salt selected from the class consisting of soluble cupric and ferric salts;
   introducing carbon monoxide into said reaction zone to contact said medium;
   introducing oxygen simultaneously with said carbon monoxide into contact with said medium to maintain said redox salt in its highest valency state;
   maintaining the temperature of the reaction medium between about 30° and 300° C.; and
   maintaining the pressure in said reaction zone between about 5 and 700 atmospheres.

2. The method of claim 1 wherein said platinum group metal is palladium.

3. The method of claim 1 wherein said alcohol is ethanol.

4. The method of claim 1 wherein said redox metal salt is ferric chloride and the ratio of chloride to ferric ions in said solution is less than about 5.

5. The method of claim 1 wherein said redox metal salt is cupric chloride.

6. The method of claim 1 wherein the oxygen content of the gas phase in the reaction zone is determined and the oxygen is introduced into said reaction zone at a rate responsive thereto to maintain the oxygen content of the gas between about 1 and 10 percent.

7. The electrolytic oxidative carbonylation for the continuous oxidation of carbon monoxide to an ester of oxalic acid that comprises:
   contacting, in the anode chamber of an electrolytic cell having anode and cathode chambers separated by a porous diaphragm, carbon monoxide with an anhydrous anolyte comprising a monohydroxy alcohol having from 1 to about 20 carbons and containing a soluble salt of a platinum group metal and a redox salt selected from the class consisting of soluble cupric and ferric salts;
   maintaining the temperature of the anolyte between about 30° and 300° C.; and
   maintaining the pressure in said anode chamber between about 5 and 700 atmospheres; while
   applying a direct current voltage to said cell to maintain said redox salt in its oxidized state.

References Cited

UNITED STATES PATENTS

| 3,114,762 | 12/1963 | Mador | 260—463 |
| 3,221,045 | 11/1965 | McKeon et al. | 260—497 |
| 3,347,758 | 10/1967 | Koehl | 204—59 |

HOWARD S. WILLIAMS, *Primary Examiner.*